United States Patent [19]
Meneghini

[11] Patent Number: 6,066,964
[45] Date of Patent: May 23, 2000

[54] DYNAMIC BUS

[75] Inventor: Thomas L. Meneghini, Ft. Collins, Colo.

[73] Assignee: Hewlett-Packard Company, Palo Alto, Calif.

[21] Appl. No.: 09/167,032

[22] Filed: Oct. 6, 1998

[51] Int. Cl.[7] .......................... H03K 19/00; H03K 19/096
[52] U.S. Cl. ................................. 326/93; 326/95; 326/83; 326/112
[58] Field of Search .................................. 326/93, 95, 98, 326/82, 83, 112, 113

Primary Examiner—Michael Tokar
Assistant Examiner—Daniel D. Chang

[57] ABSTRACT

A bi-phase, single-wire dynamic bus for allowing communication during either of a first phase or a second phase of a clock signal is presented. A data signal that is to be written onto a single bus wire is written onto the bus, via a write enable circuit, during one of the first or second clock phase. A precharger circuit precharges the bus on the subsequent clock phase, which is the other of the first or second clock phase.

17 Claims, 4 Drawing Sheets

DYNAMIC BUS

FIELD OF THE INVENTION

The present invention pertains generally to dynamic logic circuits, and more particularly to a bi-phase, single-wire dynamic bus.

BACKGROUND OF THE INVENTION

The semiconductor industry continues to yield integrated circuits (ICs) of increasing density in order to reduce their overall required chip space. At the same time, logic circuits continue to increase in speed, via a combination of higher component switching and pipelining techniques that increase the data throughput.

A standard dynamic bus normally operates in accordance with a clock signal CK, as illustrated in FIG. 1. Clock signal CK has two timing phases—an evaluate phase CK1 and a precharge phase CK2. Components connected to the bus are precharged during precharge phase CK2 and evaluate during evaluate phase CK1. This type of bus is known generally as a single-phase dynamic bus. As the name implies, single-phase dynamic busses require that all components connected to the bus precharge and evaluate during identical phases. Accordingly, the actual bandwidth of the bus in relation to the overall bandwidth is reduced in proportion to the portion (typically 50%) of the duty cycle attributable to the precharge phase.

A common technique for increasing the actual bandwidth of the bus is known in the industry as "pipelining". Pipelining techniques take advantage of the down-time spent during the precharge phase of the clock by partitioning a logic circuit into a plurality of logic stages that are clocked using alternate phases of the common clock signal. Accordingly, while one set of alternating logic stages are evaluating during one phase, the other set of alternating logic stages are precharging. On the next phase, the first set of alternating logic stages precharge, while the second set of alternating logic stages evaluate. Each logic stage represents one clock phase. Thus, once the pipeline becomes full (that is, once the initial input data has traveled downstream through each logic stage), valid data is output from the overall logic circuit on each phase of the clock cycle.

Busses that accommodate devices that evaluate on both phases of the clock signal are herein referred to as "bi-phase". A conventional single-bit bi-phase dynamic bus is generally implemented using two independent bus wires, where one wire is dedicated to CK1 and the other is dedicated to CK2, even though CK1 and CK2 are both generated from a common clock signal. A global clock signal CK is passed through a pair of gater devices designed to generate tightly controlled and precisely timed local clock signals CK1 and CK2 for driving local clock loads. CK1 is in phase with CK; CK2 is typically 180° out of phase with CK. In a conventional design, a source latch A and a destination latch X, which by design both talk to the bus on phase CK1, are coupled to the dedicated CK1 bus wire. Similarly, a source latch B and destination latch Y, which by design both talk to the bus on phase CK2, are coupled to an independent dedicated CK2 bus wire. It will be appreciated by those skilled in the art that two independent bus wires are required to accommodate devices that precharge/evaluate on different clock phases. Two independent bus wires are required because if both types of devices were connected to the same bus wire, a drive fight would result each time the bus was precharged for CK1 type devices at the same time CK2-type devices was trying to drive the bus during its evaluate phase. Furthermore, as a result of the drive fight, it would be impossible to transfer data over the bus. Thus, the implementation of a dynamic bi-phase, single-bit bus has heretofore required two independent wires when different devices in the circuit access the bus on both CK1 and CK2 clock phases.

The alternative to using a dynamic bus is to use a tri-state bus. Because tri-state busses do not rely on the different phases of the clock signal to operate, a single-bit tri-state bus can be implemented using a single wire. Tri-state bus drivers and their associated control logic, however, are more complex than dynamic bus drivers, and thus require more chip area to implement. In addition, tri-state busses are slower than dynamic busses.

As described previously, even with today's advanced techniques, a need always exists to push the limits of speed and space. Accordingly, it would be desirable to be able to combine the benefits (i.e., performance and chip area requirement improvements) of a dynamic bus with that of a tri-state bus (i.e., a single-wire implementation). In particular, a need exists for a bi-phase, single-wire dynamic bus.

SUMMARY OF THE INVENTION

The present invention is a novel bi-phase, single-wire dynamic bus. The bi-phase, single-wire dynamic bus of the invention allows devices that talk to the bus on different clock phases CK1 or CK2 to share the bus, thus reducing the implementation to a single-wire bus while maintaining the tri-state properties of the bus. The design includes a dynamic aspect which yields the area and performance benefits of dynamic bus technology, while the single-wire, bi-phase aspect preserves the benefits of a tri-state bus without the area penalties of tri-state drivers.

In accordance with the invention, each device that is connected to the single bus wire has an associated write enable circuit that operates to couple its corresponding device's output data signal onto the bus wire during one of the two phases of the clock signal. The single bus wire is coupled to a precharger which precharges the bus wire during the immediately subsequent clock phase of those clock phases during which the bus gets discharged.

In one embodiment, the write enable circuit is implemented using an AND gate coupled to receive a write enable signal and the data signal. The output of the AND gate is then coupled directly to the bus wire.

In another embodiment, the write enable circuit is implemented with an inverter, a NOR gate, and an NFET switch. The inverter is connected to receive and invert a write enable signal, which is then fed as an input to the NOR gate. The data signal is fed into the other input of the NOR gate, which generates a discharge signal. The switch is responsive to the discharge signal to couple the bus wire to a circuit ground, thereby discharging the bus when the data signal is low.

CK1-type source and destination registers can thus pass data back and forth across the same wire that CK2-type source and destination registers pass data back and forth over, thus reducing the implementation of a single-bit bus to a single wire while maintaining the dynamic properties of the bus.

BRIEF DESCRIPTION OF THE DRAWING

The invention will be better understood from a reading of the following detailed description taken in conjunction with the drawing in which like reference designators are used to designate like elements, and in which.

DETAILED DESCRIPTION

A novel bi-phase single-wire dynamic bus that supports connection to devices clocked on different phases of a clock signal is described in detail hereinafter.

Figure 1:
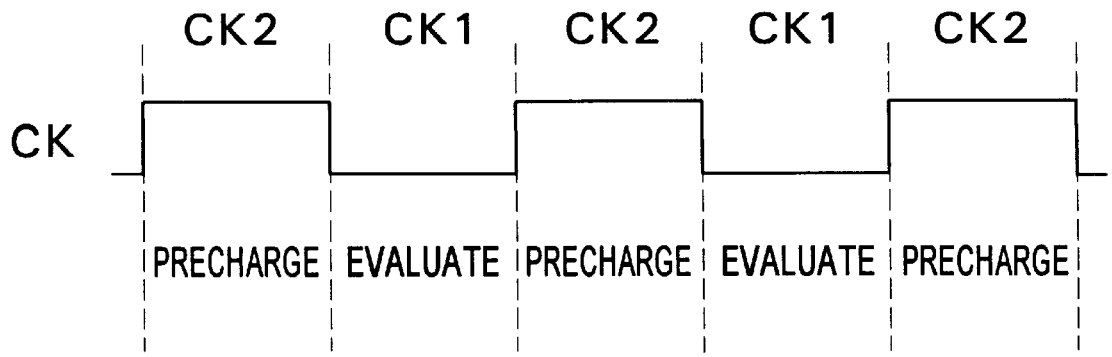
FIG. 1 is a timing diagram illustrating the dual phases of a clock signal in accordance with the operation of a single-phase dynamic bus.
Figure 2:
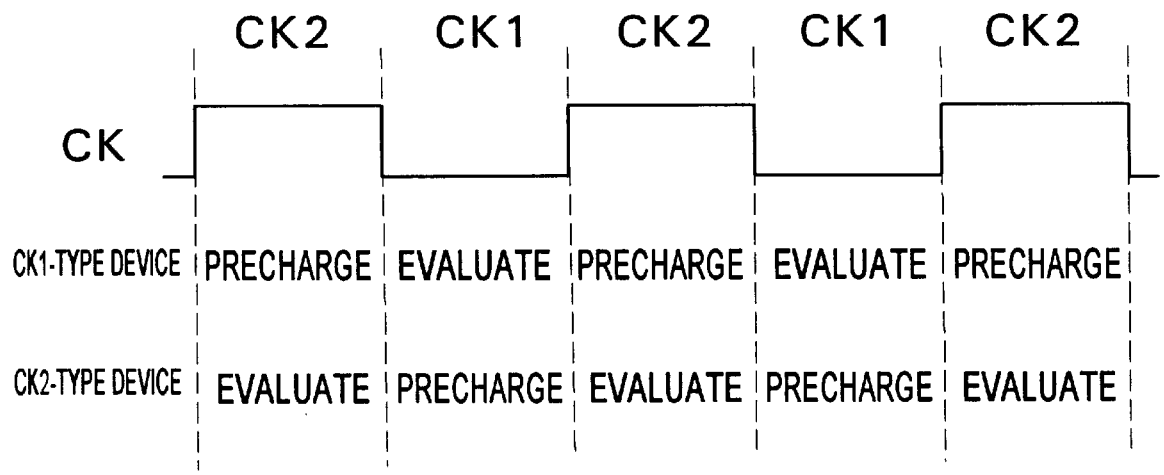
FIG. 2 is a timing diagram illustrating the dual phases of a clock signal in accordance with the operation of a bi-phase dynamic bus.

FIG. 2 is a timing diagram illustrating the alternating clock phases of different devices on a bi-phase dynamic bus. As described previously, a bi-phase dynamic bus allows devices, namely CK1-type devices and CK2-type devices, that talk to the bus on different respective clock phases CK1 or CK2 to share the bus. As shown in FIG. 2, CK1-type components connected to the bus precharge during pre-charge phase CK2 and evaluate during evaluate phase CK1. Similarly, CK2-type components connected to the bus pre-charge during precharge phase CK1 and evaluate during evaluate phase CK2.

Figure 3:
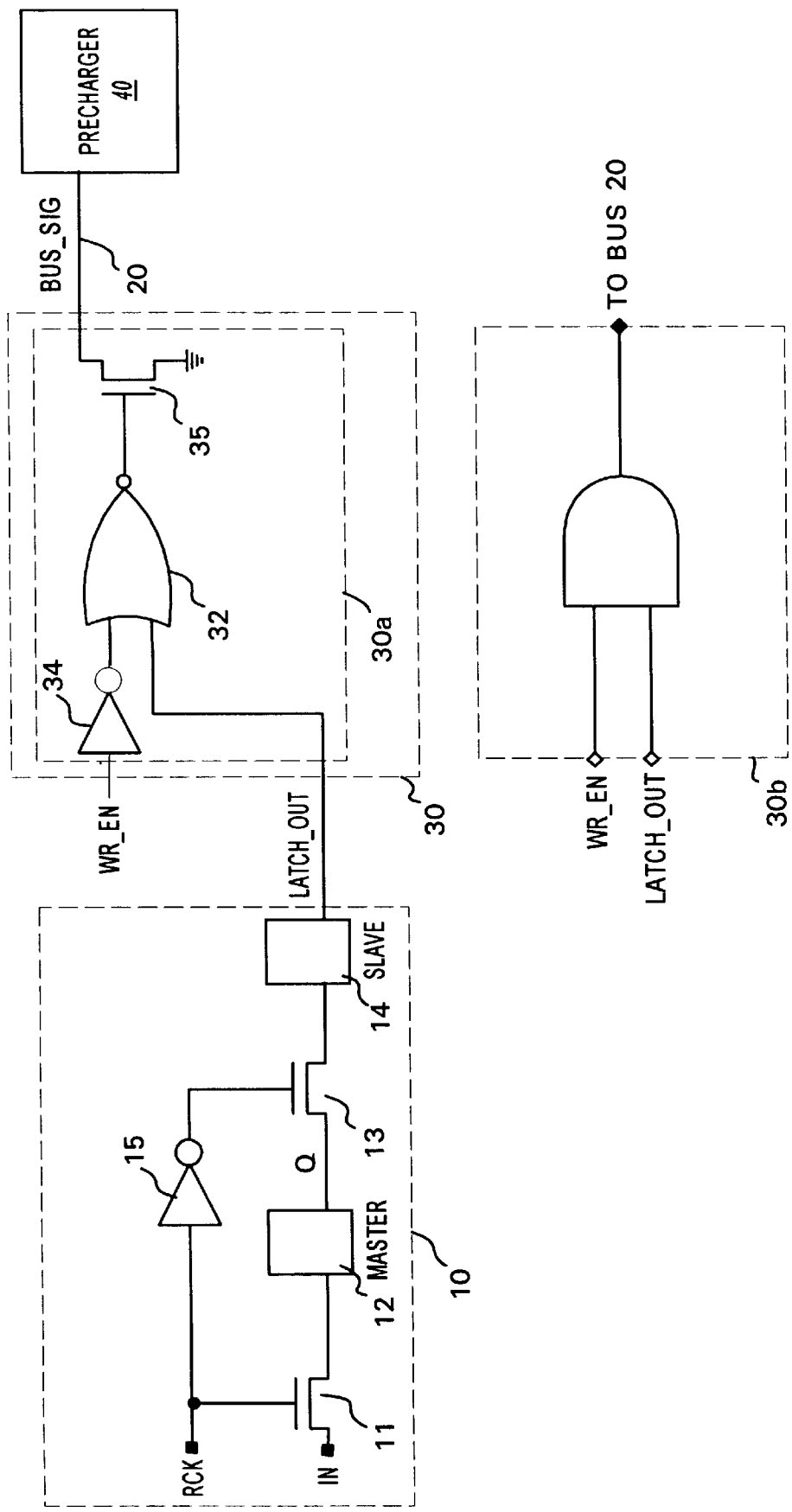
FIG. 3 is a schematic diagram of a bi-phase, single-wire dynamic bus in accordance with the invention.

FIG. 3 is a schematic diagram of a logic register 10 that is coupled, through a write circuit 30, to the bi-phase, single-wire dynamic bus 20. Logic register 10 is a master/slave latch driven by input signal IN coupled at the source of N-type field effect transistor (NFET) transfer gate 11. Transfer gate 11 is coupled at its gate, and thus is controlled by, clock input signal RCK. Clock input signal RCK is either CK1 or CK2 depending on whether register 10 is a CK1-type device or a CK2-type device. Clock input RCK is inverted via inverter 15 to generate inverted clock input signal RCK that controls transfer gate 13. Transfer gate 13 is coupled between master latch 12 and slave latch 14, and operates as a switch to control the transfer of the contents of master latch 12 into slave latch 14.

When clock input signal RCK enters its evaluate phase, which in the illustrative embodiment is defined to be when RCK is logically high, input signal IN is transferred from the source to the drain of transfer gate 11 and thus into master latch 12. Meanwhile, transfer gate 13 receives the inverted clock signal RCK', which is low when RCK is in its evaluate phase. Accordingly, transfer gate 13 is closed, thereby isolating the value held in slave latch 14 from the signal being written into master latch 12.

When clock input RCK enters its pre-charge phase, it falls low. As a result, transfer gate 11 switches off and the value in master latch 12 at the time transfer gate 11 closes is held. In the meantime, inverted clock signal RCK' goes high, turning transfer gate 13 on, to allow the value held in master latch 12 to be transferred to slave latch 14.

Write circuit 30 is implemented in one embodiment with a 2-input NOR gate 32 that receives as input the value held by slave latch 14 and inverted write enable signal WR_EN as inverted by inverter 34. Bus 20 is coupled to a precharger 40 that operates to monitor bus 20 for a discharge event, and to precharge bus 20 on the next clock phase immediately following the phase in which the discharge event occurred. Accordingly, if a discharge event is detected during a CK1 phase, precharger 40 precharges the bus on the following phase, i.e., during the next CK2 phase If, on the other hand, a discharge event is detected during a CK2 phase, precharger 40 precharges the bus on the next CK1 phase. Accordingly, precharger 40 requires some intelligence—that is, it must remember the history of the preceding phase to determine whether to precharge the bus in the current phase.

In an alternative embodiment, shown in FIG. 3 as 30b, write enable circuit 30 is implemented with a two-input AND gate which receives and ANDs together the write enable signal WR_EN and the latch output signal LATCH_OUT. The output of the AND gate is coupled directly to bus 20.

In order to precharge the bus 20 on either clock phase CK1 or CK2, precharger 40 is not specifically wired to one clock phase CK1 or CK2 only. In one embodiment, pre-charger 40 is implemented using an intelligent precharger which has the ability to detect the phase upon which to precharge based upon the state of the bus during the previous phase. One implementation of the intelligent precharger is described in copending U.S. patent application Ser. No. 09/167,079, entitled "An Intelligent Precharger for a Dynamic Bus" to Dorweiler, et al., and is incorporated herein by reference.

Write circuit 30 operates to pull down bus 20 only when write enable signal WR_EN is enabled (logically high) and the value held by slave latch 14 is logically low. If WR_EN is enabled and the value held by slave latch 14 is high, bus 20 is already logically high due to a prior precharging event (one or more clock phases ago) by precharger 40.

Bus 20 is coupled to a precharger 40 and typically to a number of source and destination latches. A typical design using the bi-phase single-wire dynamic bus 20 includes a first set of CK1-type latches designed to write to and/or read from bus 20 on the CK1 phase, and a second set of CK2-type latches designed to write to and/or read from bus 20 on the CK2 phase. The bi-phase, single-wire dynamic bus 20 of the invention allows writes to and/or reads from bus 20 on either phase CK1 or CK2 and implemented with only a single wire.

Figure 4:
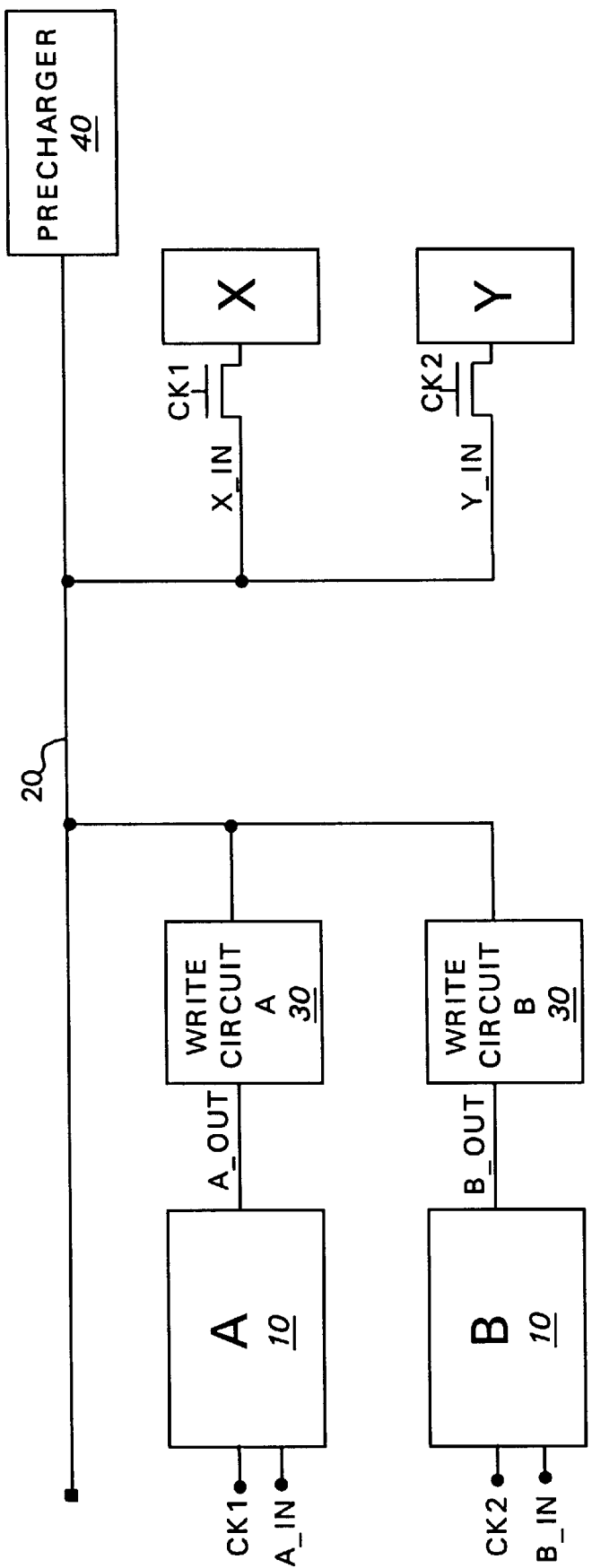
FIG. 4 is a schematic diagram of an example bus of the invention.

FIG. 4 is a schematic diagram of an example use of the bus of the invention. Latches A, B, X and Y are all coupled to the bus. Source latch A and destination latch X each talk to the bus during a CK1 phase; source latch B and destination latch Y each talk to the bus during a CK2 phase. To illustrate one mode of operation, suppose source latch A is to write to destination latch X. When CK1 rises, data A_IN is coupled into master latch. When CK1 falls, data A_IN is transferred from master latch to slave latch. During the CK2 phase, data A_OUT is available at the output of latch A and is written via write circuit A onto bus 20. The data A_OUT is valid on bus 20 from the rising edge of CK2 until the subsequent rising edge of CK2. Thus data A_OUT is guaranteed to be valid when latch X connects to the bus 20 on the next rising edge of CK1. Accordingly, latch A can write to latch X.

In another mode of operation, CK1-type latch A can write to CK2-type latch Y provided that the timing of the write enable signal isolates the source latch A from the bus 20 prior to the next rising edge of CK1.

Figure 5:
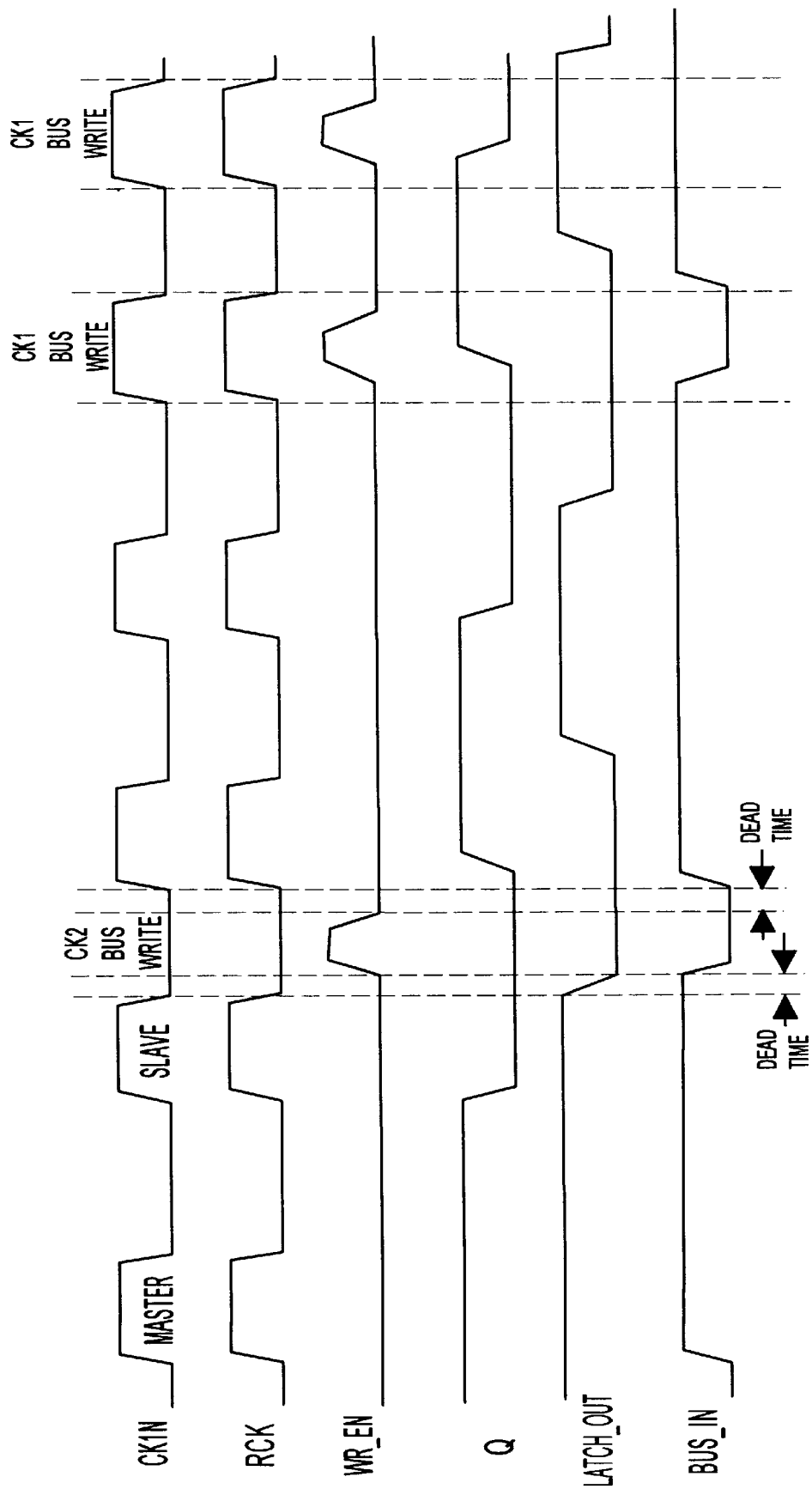
FIG. 5 is a timing diagram of bus signals during a write operation.

FIG. 5 is a timing diagram illustrating the operation of a bus in accordance with the invention and showing both CK1 phase and CK2 phase writes onto the bus. In this embodiment, since both CK1 and CK2 phase writes onto the bus are allowed, the write enable signal WR_EN is timed to provide a pulse roughly in the middle of the phase of the clock CK1 or CK2 that controls the master to slave latch.

This is done to avoid a one-to-zero race condition in the slave latch while it is connected to the bus. By delaying the rising edge of WR_EN, a potential race is avoided when the bus is configured to write during a CK1 phase. Advancing the falling edge of WR_EN avoids a race when the bus is configured to write during a CK2 phase.

It will be appreciated by those skilled in the art that the invention described herein provides inherent advantages over the prior art. A single wire can be used to send data back and forth on both phases of the clock with the speed and size benefits of dynamic circuitry without the costs associated with conventional tri-state bus drivers.

Although the invention has been described in terms of the illustrative embodiments, it will be appreciated by those skilled in the art that various changes and modifications may be made to the illustrative embodiments without departing from the spirit or scope of the invention. It is intended that the scope of the invention not be limited in any way to the illustrative embodiment shown and described but that the invention be limited only by the claims appended hereto.

What is claimed is:

1. A bi-phase, single-wire dynamic bus for allowing writes onto said bus during either of a first phase or a second phase of a clock signal, said bus comprising:
    a bus wire;
    a write enable circuit operable to couple a data signal onto said bus wire during one of said first phase or said second phase; and
    a precharger which precharges said bus wire during a next clock phase, said next clock phase comprising the other of said first phase or said second phase of said clock signal during which said data signal was written onto said bus wire by said write enable circuit.

2. A bi-phase, single-wire dynamic bus in accordance with claim 1, wherein:
    said precharger precharges said bus wire only if said bus wire was discharged during said one of said first phase or said second phase.

3. A bi-phase, single-wire dynamic bus in accordance with claim 1, wherein:
    said write enable circuit discharges said single-wire bus when said data signal is low.

4. A bi-phase, single-wire dynamic bus in accordance with claim 3, wherein:
    said precharger precharges said bus wire only if said bus wire was discharged during said one of said first phase or said second phase.

5. A bi-phase, single-wire dynamic bus in accordance with claim 1, wherein:
    said write enable circuit is responsive to a write enable signal to write said data signal onto said bus wire.

6. A bi-phase, single-wire dynamic bus in accordance with claim 5, wherein:
    said write enable circuit comprises:
        an AND gate coupled to receive said write enable signal and said data signal, said AND gate having an output coupled to said bus wire.

7. A bi-phase, single-wire dynamic bus in accordance with claim 5, wherein:
    said write enable circuit comprises:
        an inverter connected to receive said write enable signal and to generate an inverted write enable signal;
        a NOR gate coupled to receive said data signal and said inverted write enable signal and to generate a discharge signal; and
        a switch coupled between said bus wire and a circuit ground, said switch being responsive to said discharge signal by coupling said bus wire to said circuit ground.

8. A bi-phase, single-wire dynamic bus for allowing writes onto said bus during either of a first phase or a second phase of a clock signal, said bus comprising:
    a bus wire;
    a first write enable circuit operable to couple a first data signal onto said bus wire during one of said first phase or said second phase;
    a first source register having an output coupled to said bus wire, said first source register generating said first data signal during said one of said first phase or said second phase; and
    a precharger which precharges said bus wire during a next clock phase, said next clock phase comprising the other of said phase of said clock signal after said phase of said clock signal during which said bus wire is discharged.

9. A bi-phase, single-wire dynamic bus in accordance with claim 8, comprising:
    a first destination register having an input coupled to said bus wire, said first destination register operable to read from said bus wire during said one of said first phase or said second phase.

10. A bi-phase, single-wire dynamic bus in accordance with claim 8, comprising:
    a second write enable circuit operable to couple a second data signal onto said bus wire during the other of said first phase or said second phase;
    a second source register having an output coupled to said bus wire, said second source register generating said second data signal during said other of said first phase or said second phase.

11. A bi-phase, single-wire dynamic bus in accordance with claim 9, comprising:
    a second destination register having an input coupled to said bus wire, said second destination register operable to read from said bus wire during said other of said first phase or said second phase.

12. A bi-phase, single-wire dynamic bus in accordance with claim 9, comprising:
    a second write enable circuit operable to couple a second data signal onto said bus wire during the other of said first phase or said second phase;
    a second source register having an output coupled to said bus wire, said second source register generating said second data signal during said other of said first phase or said second phase.

13. A bi-phase, single-wire dynamic bus in accordance with claim 12, comprising:
    a second destination register having an input coupled to said bus wire, said second destination register operable to read from said bus wire during said other of said first phase or said second phase.

14. A method for writing onto a bi-phase, single-wire dynamic bus during either of a first phase or a second phase of a clock signal, said method comprising:
    writing a data signal onto said bus during either of said first phase or said second phase; and
    precharging said bus on said next phase of said clock signal, said next phase comprising said other of said either of said first phase or said second phase immediately following said either of said first phase or said second phase.

15. A method in accordance with claim 14, wherein:

said precharging step comprises precharging said bus only if said bus was discharged during said either of said first phase or said second phase.

16. A method in accordance with claim 14, wherein:

said writing step comprises discharging said bus if said data signal is logically low.

17. A method in accordance with claim 16, wherein:

said precharging step comprises precharging said bus only if said bus was discharged during said either of said first phase or said second phase.

\* \* \* \* \*